(12) United States Patent
Mullins

(10) Patent No.: US 11,024,087 B2
(45) Date of Patent: ***Jun. 1, 2021

(54) CONTEXTUAL LOCAL IMAGE RECOGNITION DATASET

(71) Applicant: RPX Corporation, San Francisco, CA (US)

(72) Inventor: Brian Mullins, Altadena, CA (US)

(73) Assignee: RPX Corporation, San Francisco, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/249,656

(22) Filed: Jan. 16, 2019

(65) Prior Publication Data

US 2019/0147663 A1    May 16, 2019

Related U.S. Application Data

(63) Continuation of application No. 15/444,115, filed on Feb. 27, 2017, now Pat. No. 10,210,663, which is a
(Continued)

(51) Int. Cl.
*G06T 19/00* (2011.01)
*H04N 1/00* (2006.01)
(Continued)

(52) U.S. Cl.
CPC .......... *G06T 19/006* (2013.01); *G06F 1/1686* (2013.01); *G06F 3/005* (2013.01);
(Continued)

(58) Field of Classification Search
CPC .............. G06T 19/006; G06F 17/3028; G06F 17/30256; H04N 1/00244; H04N 2201/0084; G06K 9/00671
See application file for complete search history.

(56) References Cited

U.S. PATENT DOCUMENTS 6,879,946 B2    4/2005  Rong et al.
7,705,858 B2    4/2010  Ubillos et al.
(Continued)

FOREIGN PATENT DOCUMENTS

AU    2014235484 B2    1/2018
JP    2009116871 A     5/2009
(Continued)

OTHER PUBLICATIONS

"U.S. Appl. No. 13/839,818, Non Final Office Action dated Oct. 23, 2014", 10 pgs.
(Continued)

*Primary Examiner* — Ming Y Hon
(74) *Attorney, Agent, or Firm* — Schwegman Lundberg & Woessner, P.A.

(57) ABSTRACT

A contextual local image recognition module of a device retrieves a primary content dataset from a server and then generates and updates a contextual content dataset based on an image captured with the device. The device stores the primary content dataset and the contextual content dataset. The primary content dataset comprises a first set of images and corresponding virtual object models. The contextual content dataset comprises a second set of images and corresponding virtual object models retrieved from the server.

20 Claims, 6 Drawing Sheets

Related U.S. Application Data continuation of application No. 14/747,043, filed on Jun. 23, 2015, now Pat. No. 9,613,462, which is a continuation of application No. 13/839,818, filed on Mar. 15, 2013, now Pat. No. 9,070,217.

(51) Int. Cl.

| | | |
|---|---|---|
| *G06F 3/00* | (2006.01) | |
| *G06F 16/50* | (2019.01) | |
| *G06F 16/51* | (2019.01) | |
| *G06F 16/955* | (2019.01) | |
| *G06F 16/583* | (2019.01) | |
| *G06F 1/16* | (2006.01) | |
| *G06F 3/147* | (2006.01) | |
| *G06T 1/00* | (2006.01) | |
| *G06K 9/00* | (2006.01) | |
| *G06F 3/01* | (2006.01) | |

(52) U.S. Cl.
CPC .............. *G06F 3/147* (2013.01); *G06F 16/50* (2019.01); *G06F 16/51* (2019.01); *G06F 16/5838* (2019.01); *G06F 16/955* (2019.01); *G06K 9/00671* (2013.01); *G06T 1/0007* (2013.01); *H04N 1/00244* (2013.01); *G06F 3/011* (2013.01); *G06T 2200/04* (2013.01); *H04N 2201/0084* (2013.01)

(56) References Cited

U.S. PATENT DOCUMENTS

| | | | |
|---|---|---|---|
| 7,844,229 B2 | 11/2010 | Gyorfi et al. | |
| 8,036,416 B2 | 10/2011 | Matsumoto et al. | |
| 8,055,061 B2 | 11/2011 | Katano | |
| 8,502,835 B1 | 8/2013 | Meehan | |
| 8,524,736 B2 | 9/2013 | Irwin et al. | |
| 8,743,224 B2 | 6/2014 | Harple et al. | |
| 8,803,992 B2 | 8/2014 | Shingu et al. | |
| 8,824,736 B2 | 9/2014 | Lefevre et al. | |
| 9,064,326 B1* | 6/2015 | Loxam ............... | G06K 9/00979 |
| 9,070,217 B2 | 6/2015 | Mullins | |
| 9,613,462 B2 | 4/2017 | Mullins et al. | |
| 10,210,663 B2 | 2/2019 | Mullins | |
| 2003/0140038 A1* | 7/2003 | Baker ................. | G06F 16/58 |
| 2004/0109012 A1 | 6/2004 | Kraus et al. | |
| 2008/0074424 A1 | 3/2008 | Carignano | |
| 2010/0066750 A1 | 3/2010 | Yu et al. | |
| 2010/0302143 A1 | 12/2010 | Spivack | |
| 2011/0148922 A1 | 6/2011 | Son et al. | |
| 2011/0216090 A1 | 9/2011 | Woo et al. | |
| 2012/0086727 A1 | 4/2012 | Korah et al. | |
| 2012/0243732 A1 | 9/2012 | Swaminathan et al. | |
| 2013/0044128 A1* | 2/2013 | Liu .................... | G06T 19/006 345/633 |
| 2013/0129252 A1* | 5/2013 | Lauper .................. | G06F 16/489 382/276 |
| 2013/0194259 A1* | 8/2013 | Bennett ................. | G06T 19/006 345/420 |
| 2013/0286048 A1* | 10/2013 | Sternitzke ............ | G06F 16/487 345/633 |
| 2014/0267403 A1* | 9/2014 | MacIocci .............. | G06F 3/017 345/633 |
| 2014/0267792 A1 | 9/2014 | Mullins | |
| 2015/0371448 A1 | 12/2015 | Mullins | |
| 2017/0169619 A1 | 6/2017 | Mullins | |

FOREIGN PATENT DOCUMENTS

| | | |
|---|---|---|
| JP | 2012181748 A | 9/2012 |
| JP | 2012190085 A | 10/2012 |
| JP | 2013025327 A | 2/2013 |
| WO | WO-2012166577 A1 | 12/2012 |
| WO | WO-2014150947 A1 | 9/2014 |

OTHER PUBLICATIONS

"U.S. Appl. No. 13/839,818, Notice of Allowance dated May 8, 2015", 16 pgs.
"U.S. Appl. No. 13/839,818, Response filed Mar. 23, 2015 to Non Final Office Action dated Oct. 23, 2014", 12 pgs.
"U.S. Appl. No. 14/747,043, Corrected Notice of Allowance dated Feb. 23, 2017", 2 pgs.
"U.S. Appl. No. 14/747,043, Final Office Action dated Apr. 20, 2016", 7 pgs.
"U.S. Appl. No. 14/747,043, Non Final Office Action dated Aug. 12, 2016", 8 pgs.
"U.S. Appl. No. 14/747,043, Non Final Office Action dated Dec. 3, 2015", 12 pgs.
"U.S. Appl. No. 14/747,043, Notice of Allowance dated Nov. 22, 2016", 8 pgs.
"U.S. Appl. No. 14/747,043, PTO Response to Rule 312 Communication dated Mar. 1, 2017", 2 pgs.
"U.S. Appl. No. 14/747,043, Response filed Mar. 3, 2016 to Non Final Office Action dated Dec. 3, 2015", 9 pgs.
"U.S. Appl. No. 14/747,043, Response filed Jul. 20, 2016 to Final Office Action dated Apr. 20, 2016", 9 pgs.
"U.S. Appl. No. 14/747,043, Response filed Oct. 12, 2016 to Non Final Office Action dated Aug. 12, 2016", 11 pgs.
"U.S. Appl. No. 15/444,115, Examiner Interview Summary dated Jun. 15, 2018", 3 pgs.
"U.S. Appl. No. 15/444,115, Non Final Office Action dated May 17, 2018", 11 pgs.
"U.S. Appl. No. 15/444,115, Notice of Allowance dated Oct. 11, 2018", 8 pgs.
"U.S. Appl. No. 15/444,115, Response filed Jun. 18, 2018 to Final Office Action dated May 17, 2018", 13 pgs.
"Australian Application Serial No. 2014235484, First Examination Report Received, dated May 11, 2017", w/ English Translation, 21 pgs.
"Australian Application Serial No. 2014235484, Response filed Aug. 23, 2017 to Subsequent Examiners Report dated Jul. 25, 2017", 1 pg.
"Australian Application Serial No. 2014235484, Subsequent Examiners Report dated Jul. 25, 2017", 2 pgs.
"European Application Serial No. 14769648.8, Extended European Search Report dated Jun. 29, 2016", 8 pgs.
"European Application Serial No. 14769648.8, Response filed Apr. 25, 2016 to Communication pursuant to Rules 161(1) and 162 EPC dated Oct. 29, 2015", 13 pgs.
"International Application Serial No. PCT/US2014/024625, International Preliminary Report on Patentability dated Sep. 24, 2015", 8 pgs.
"International Application Serial No. PCT/US2014/024625, International Search Report dated Jul. 17, 2014", 3 pgs.
"International Application Serial No. PCT/US2014/024625, Written Opinion dated Jul. 17, 2014", 6 pgs.
"Japanese Application Serial No. 2016-501589, Office Action dated Jan. 30, 2018", w/English Translation, 7 pgs.
"New Zealand Application Serial No. 713286, First Examiner Report dated Nov. 14, 2017", 3 pgs.
"New Zealand Application Serial No. 713286, Subsequent Examiners Report dated Jan. 18, 2018", 2 pgs.
"Response to European Application Serial No. 14769648.8, Extended European Search Report dated Jun. 29, 2016", 14 pgs.
"European Application Serial No. 14769648.8, Communication Pursuant to Article 94(3) EPC dated Apr. 11, 2019", 7 pgs.
"European Application Serial No. 14769648.8, Response filed Dec. 16, 2019 to Communication Pursuant to Article 94(3) EPC dated Apr. 11, 2019", 17 pgs.
"European Application Serial No. 14769648.8, Summons to Attend Oral Proceedings dated Jun. 23, 2020", 9 pgs.
"Korean Application Serial No. 10-2015-7029890, Notice of Preliminary Rejection dated Aug. 25, 2020", w/ English translation, 7 pgs.

(56) References Cited

OTHER PUBLICATIONS

"Korean Application Serial No. 10-2015-7029890, Response filed Oct. 26, 2020 to Notice of Preliminary Rejection dated Aug. 25, 2020", w/ English claims, 30 pgs.

* cited by examiner

CONTEXTUAL LOCAL IMAGE RECOGNITION DATASET

CLAIM OF PRIORITY

This application is a continuation of and claims the benefit of priority U.S. application Ser. No. 15/444,115, filed Feb. 27, 2017, which is a continuation of and claims the benefit of priority U.S. application Ser. No. 14/747,043, filed Jun. 23, 2015, which is a continuation of and claims the benefit of priority of U.S. application Ser. No. 13/839,818, filed Mar. 15, 2013, which is hereby incorporated by reference in its entirety.

TECHNICAL FIELD

The subject matter disclosed herein generally relates to the processing of data. Specifically, the present disclosure addresses systems and methods that involve a contextual local image recognition dataset.

BACKGROUND

A device can be used to generate data based on an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision and object recognition), the information about the surrounding real world of the user becomes interactive. Device-generated (e.g., artificial) information about the environment and its objects can be overlaid on the real world.

The device may constantly scan and capture images and send them to an AR server for recognition. Once an image matches with a stock image in the database of the AR server, the device then downloads the three-dimensional model from the AR server. The constant uploading of scanned images from the device to the server and the constant downloading of the three-dimensional models may add data traffic to limited and valuable network bandwidth between the device and AR server.

BRIEF DESCRIPTION OF THE DRAWINGS

Some embodiments are illustrated by way of example and not limitation in the figures of the accompanying drawings.

DETAILED DESCRIPTION

Example methods and systems are directed to a contextual local image recognition dataset. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a virtual object overlaid on a picture of a physical object captured by a camera of a device. The physical object may include a visual reference that the augmented reality application can identify. A visualization of the additional information, such as the virtual object engaged (e.g., overlaid on top of) with an image of the physical object is generated in a display of the device. The virtual object may be generated based on the recognized visual reference. A rendering of the visualization of the virtual object may be based on a position of the display relative to the visual reference.

A contextual local image recognition module in the device retrieves a primary content dataset from a server. The primary content dataset comprises a first set of images and corresponding virtual object models. For example, the first set of images may include most common images that a user of the device is likely to capture with the device. The contextual content dataset comprises a second set of images and corresponding virtual object models retrieved from the server. The contextual local image recognition module generates and updates the contextual content dataset based an image captured with the device. A storage device of the device stores the primary content dataset and the contextual content dataset.

Figure 1:
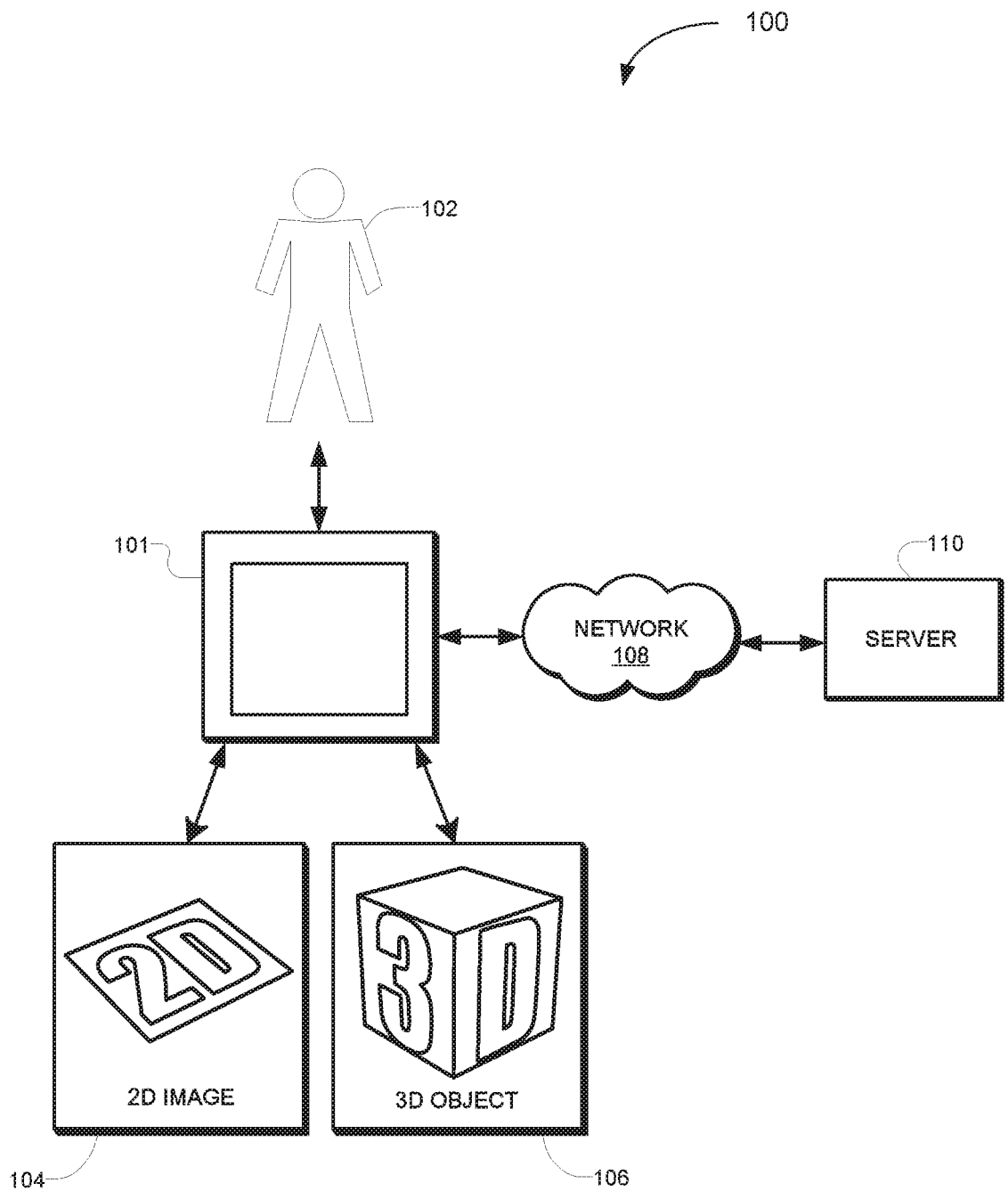
FIG. 1 is a block diagram illustrating an example of a network suitable for operating the device, according to some example embodiments.

FIG. 1 is a network diagram illustrating a network environment 100 suitable for operating an augmented reality application of a device, according to some example embodiments. The network environment 100 includes a device 101 and a server 110, communicatively coupled to each other via a network 108. The device 101 and the server 110 may each be implemented in a computer system, in whole or in part, as described below with respect to FIG. 7.

The server 110 may be part of a network-based system. For example, the network-based system may be or include a cloud-based server system that provides additional information such, as three-dimensional models, to the device 101.

FIG. 1 illustrates a user 102 using the device 101. The user may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the device 101 and may be a user of the device 101. For example, the device 101 may be a desktop computer, a vehicle computer, a tablet computer, a navigational device, a portable media device, or a smart phone belonging to the user 102.

The user 102 may be a user of an application in the device 101. The application may include an augmented reality application configured to provide the user 102 with an experience triggered by a physical object such as, a two-dimensional physical object 104 (e.g., a picture) or a three-dimensional physical object 106 (e.g., a statue). For example, the user 102 may point a camera of the device 101 to capture an image of the two-dimensional physical object 104. The image is recognized locally in the device 101 using a local context recognition dataset module of the augmented reality application of the device 101. The augmented reality application then generates additional information corresponding to the image (e.g., a three-dimensional model) and presents this additional information in a display of the device 101 in response to recognizing the image. If the captured image is not recognized locally at the device 101, the device 101 downloads additional information (e.g., the three-dimensional model) corresponding to the captured image, from a database of the server 110 over the network 108.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
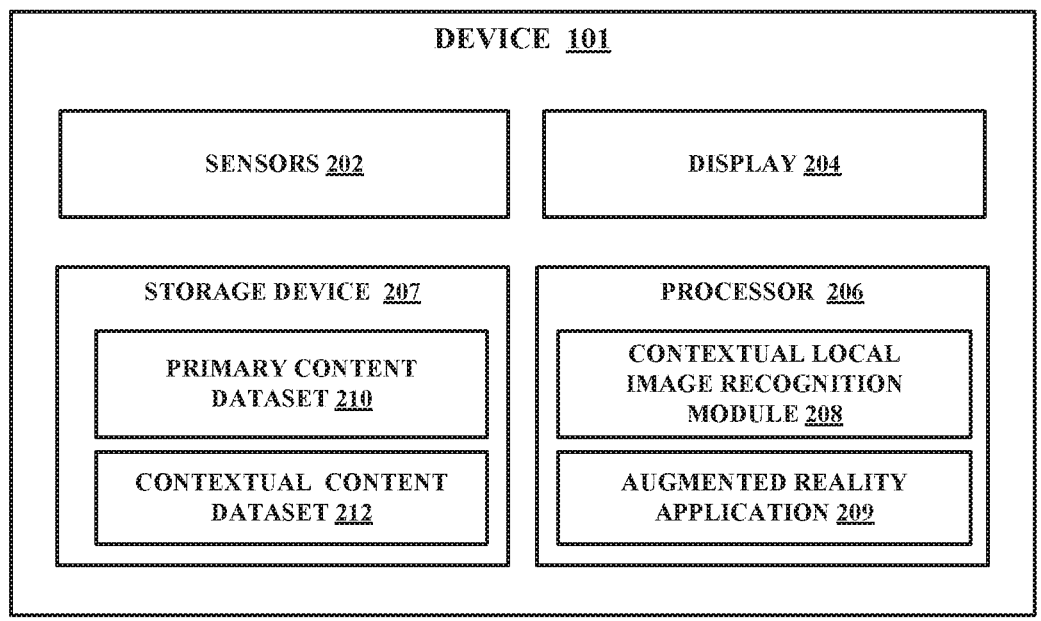
FIG. 2 is a block diagram illustrating modules (e.g., components) of the device, according to some example embodiments.

FIG. 2 is a block diagram illustrating modules (e.g., components) of the device, according to some example embodiments. The device 101 may include sensors 202, a display 204, a processor 206, and a storage device 207. For example, the device 201 may be a desktop computer, a vehicle computer, a tablet computer, a navigational device, a portable media device, or a smart phone of a user. The user may be a human user (e.g., a human being), a machine user (e.g., a computer configured by a software program to interact with the device 101), or any suitable combination thereof (e.g., a human assisted by a machine or a machine supervised by a human).

The sensors 202 may include, for example, a vibration sensor, an optical sensor (e.g., a charge-coupled device (CCD)), an orientation sensor (e.g., gyroscope), an audio sensor (e.g., a microphone), or any suitable combination thereof. For example, the sensors 202 may include a rear facing camera and a front facing camera in the device 101. It is noted that the sensors described herein are for illustration purposes and the sensors 102 are thus not limited to the ones described.

The display 204 may include, for example, a touchscreen or touch sensitive display configured to receive a user input via a contact on the touchscreen display. In another example, the display 204 may include a screen or monitor configured to display images generated by the processor 206.

The processor 206 may include an experience consuming application, such as an augmented reality application 209, configured to generate a visualization of a virtual object, such as a three-dimensional virtual object, overlaid (e.g., superimposed upon, or otherwise displayed in tandem with) on an image of a physical object captured by a camera of the device 101 in the display 204 of the device 101. A visualization of the three-dimensional virtual object may be manipulated by adjusting a position of the physical object relative to the camera of the device 101. Similarly, the visualization of the three-dimensional virtual object may be manipulated by adjusting a position of the device 101 relative to the physical object.

In one embodiment, the augmented reality application 209 communicates with a contextual local image recognition module 208 in the device 101 to retrieve three-dimensional models of virtual objects associated with a captured image (e.g., virtual object that correspond to the captured image). For example, the captured image may include a visual reference (also referred to as a marker) that consists of an identifiable image, symbol, letter, number, machine-readable code. For example, the visual reference may include a bar code, a quick response (QR) code, or an image that has been previously associated with a three-dimensional virtual object (e.g., an image that has been previously determined to correspond to the three-dimensional virtual object).

The contextual local image recognition module 208 may be configured to determine whether the captured image matches an image that is stored in a local database of images and corresponding additional information (e.g., three-dimensional model and one or more interactive features) in the storage device 207 of the device 101. In one embodiment, the contextual local image recognition module 208 retrieves a primary content dataset from the server 110 and generates and updates a contextual content dataset based an image captured by the device 101.

The storage device 207 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the device 101 relative to the picture of the shoe. Features of the three-dimensional virtual shoe may include selectable icons on the three-dimensional virtual model of the shoe. An icon may be selected or activated by tapping or moving on the device 101.

In one embodiment, the storage device 207 includes a primary content dataset 210 and a contextual content dataset 212. The primary content dataset 210 includes, for example, a first set of images and corresponding experiences (e.g., interactive three-dimensional virtual object models, downloadable content, audio, video, images, text, webpages, games, advertisements, 3D models, etc.).). The primary content dataset 210 may include a core set of images or the most popular images determined by the server 110. The core set of images may include a limited number of images identified by the server 110. For example, the core set of images may include the cover image of the ten most popular magazines and their corresponding experiences (e.g., virtual objects that rep resent the ten most popular magazines). In another example, the server 110 may generate the first set of images based on the most popular or often scanned images received at the server 110.

The contextual content dataset 212 includes, for example, a second set of images and corresponding experiences (e.g., three-dimensional virtual object models) retrieved from the server 110 based on usage of the device 101 and the augmented reality application 209. For example, images captured with the device 101 that are not recognized in the primary content dataset 210 are submitted to the server 110 for recognition. If the captured image is recognized by the server 110, a corresponding experience may be downloaded at the device 101 and stored in the contextual content dataset 212.

In one embodiment, the device 101 may communicate over the network 108 with the server 110 to retrieve a portion of a database that stores visual references, corresponding three-dimensional virtual objects, and corresponding interactive features of the three-dimensional virtual objects. The network 108 may be any network that enables communication between or among machines, databases, and devices (e.g., the device 101). Accordingly, the network 108 may be a wired network, a wireless network (e.g., a mobile or cellular network), or any suitable combination thereof. The network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
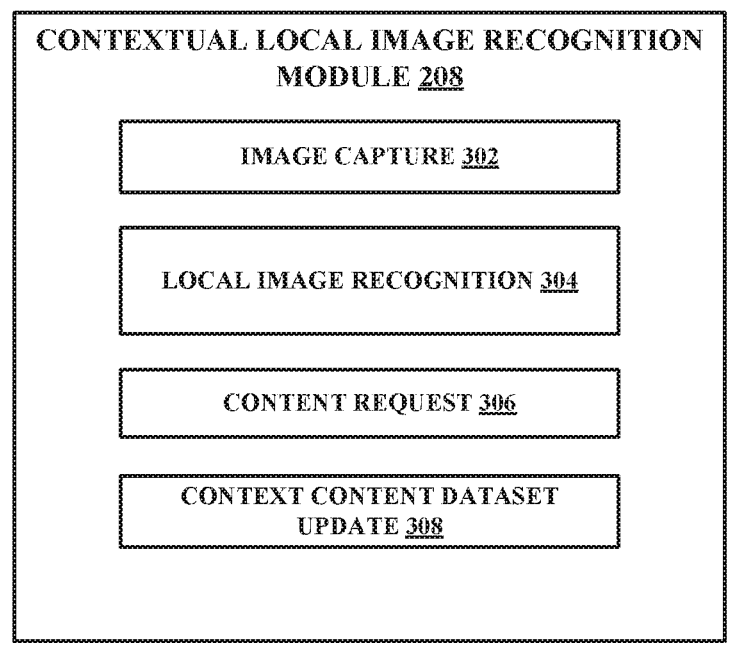
FIG. 3 is a block diagram illustrating modules (e.g., components) of a contextual local image recognition dataset module, according to some example embodiments.

FIG. 3 is a block diagram illustrating modules (e.g., components) of contextual local image recognition dataset module 208, according to some example embodiments. The contextual local image recognition dataset module 208 may include an image capture module 302, a local image recognition module 304, a content request module 306, and a context content dataset update module 308.

The image capture module 302 may capture an image with a camera of the device 101. For example, the image capture module 302 may capture the image of a physical object pointed at by the device 101. In one embodiment, the image capture module 302 may capture one image or a series of snap shots. In another embodiment, the image capture module 302 may capture an image when one of the sensors 202 (e.g., vibration, gyroscope, compass, etc.) detects that the device 101 is no longer moving or is being held steady.

The local image recognition module 304 determines that the captured image corresponds to an image stored in the primary content dataset 210 and locally renders the three-dimensional virtual object model corresponding to the image captured with the device 101 when the image captured with the device 101 corresponds to one of the set of images of the primary content dataset 210 stored in the device 101.

In another example embodiment, the local image recognition module 304 determines that the captured image corresponds to an image stored in the contextual content dataset 212 and locally renders the three-dimensional virtual object model corresponding to the image captured with the device 101 when the image captured with the device 101 corresponds to one of the set of images of the contextual content dataset 212 stored in the device 101.

The content request module 306 may request the server 110 for the three-dimensional virtual object model corresponding to the image captured with the device 101 when the image captured with the device 101 does not correspond to one of the set of images in the primary content dataset 210 and the set of images in the contextual content dataset 212 in the storage device 207.

The context content dataset up date module 308 may receive the three-dimensional virtual object model corresponding to the image captured with the device 101 from the server 110 in response to the request generated by the content request module 306. In one embodiment, the context content dataset update module 308 may up date the contextual content dataset 212 with the three-dimensional virtual object model corresponding to the image captured with the device 101 from the server 110 when the image captured with the device 101 does not correspond to any images stored locally in the storage device 207 of the device 101.

In another example embodiment, the content request module 306 may determine usage conditions of the device 101 and generate a request to the server 110 for a third set of images and corresponding three-dimensional virtual object models based on the usage conditions. The usage conditions may be related to when, how often, where, and how the user is using the device 101. The context content dataset update module 308 may up date the contextual content dataset with the third set of images and corresponding three-dimensional virtual object models.

For example, the content request module 306 determines that the user 102 scans pages of a newspaper in the morning time. The content request module 306 then generates a request to the server 110 for a set of images and corresponding experiences that are relevant to usage of the user 102 in the morning. For example, the content request module 306 may retrieve images of sports articles that the user 102 is most likely to scan in the morning and a corresponding updated virtual score board of a sports team mentioned in one of the sports articles. The experience may include, for example, a fantasy league score board update that is personalized to the user 102.

In another example, the content request module 306 determines that the user 102 often scans the business section of a newspaper. The content request module 306 then generates a request to the server 110 for a set of images and corresponding experiences that are relevant to the user 102. For example, the content request module 306 may retrieve images of business articles of the next issue of the newspaper as soon as the next issue's business articles are available. The experience may include, for example, a video report corresponding to an image of the next issue business article.

In yet another example embodiment, the content request module 306 may determine social information of the user 102 of the device 101 and generate a request to the server 110 for another set of images and corresponding three-dimensional virtual object models based on the social information. The social information may be obtained from a social network application in the device 101. The social information may relate to who the user 102 has interacted with, and with whom the user 102 has shared experiences using the augmented reality application 209 of the device 101. The context content dataset up date module 308 may update the contextual content dataset 212 with the other set of images and corresponding three-dimensional virtual object models.

For example, the user 102 may have scanned several pages of a magazine. The content request module 306 determines from a social network application that the user 102 is friends with another user who shares similar interests and reads another magazine. As such, the content request module 306 may generate a request to the server 110 for a set of images and corresponding experiences related to the other magazine.

In another example, if the content request module 306 determines that the user 102 has scanned the cover image of a magazine, the content request module 306 may generate a request for additional content related to other images in the same magazine.

Figure 4:
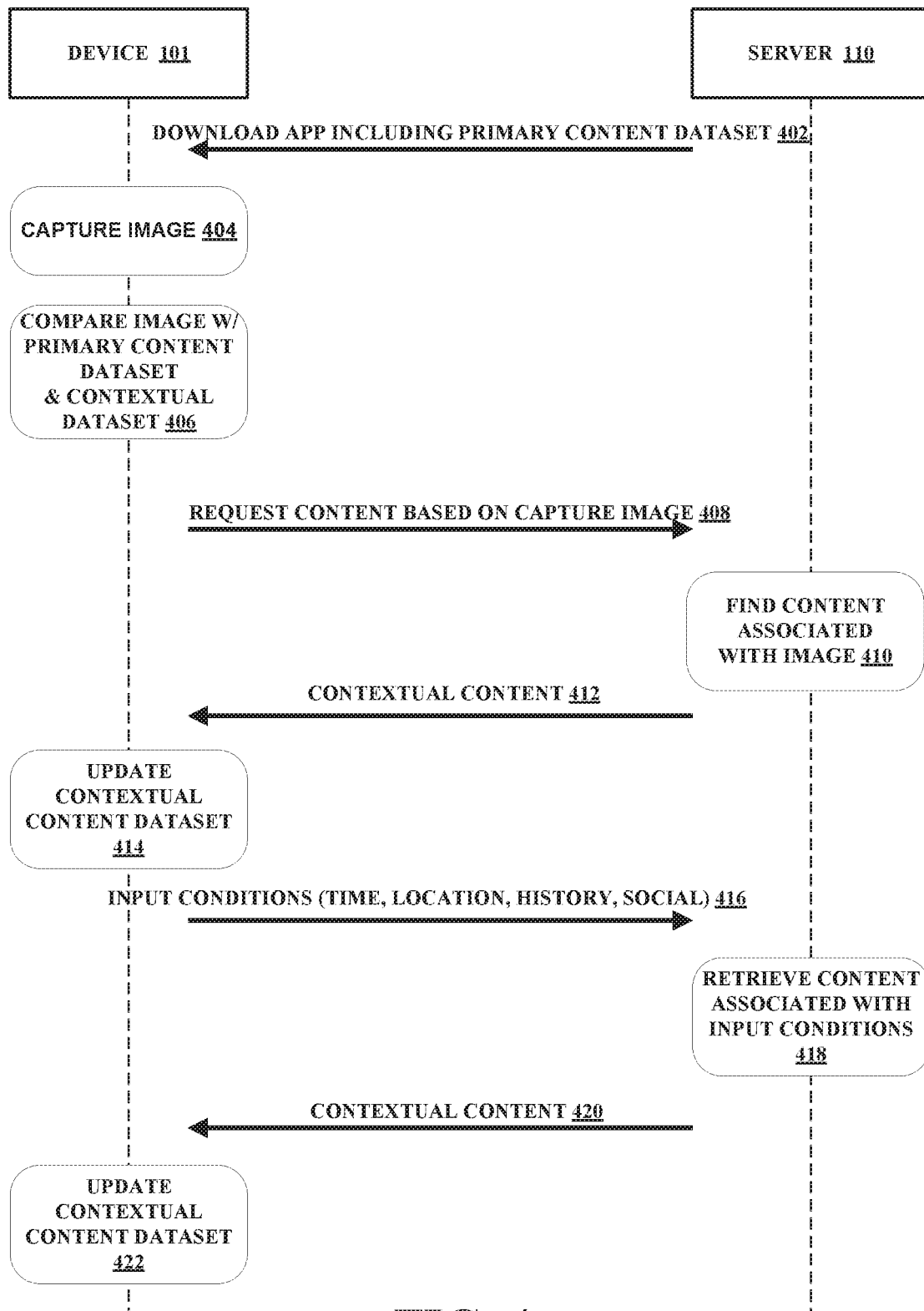
FIG. 4 is a ladder diagram illustrating an operation of the contextual local image recognition dataset module of the device, according to some example embodiments.

FIG. 4 is a ladder diagram illustrating an operation of the contextual local image recognition dataset module 208 of the device 101, according to some example embodiments. At operation 402, the device 101 downloads an augmented reality application from the server 110. The augmented reality application may include the primary content dataset 210. The primary content dataset 210 may include for example, the most often scanned pictures of ten popular magazines and corresponding experiences. At operation 404, the device 101 captures an image.

At operation 406, the device 101 compares the captured image with local images from the primary content dataset 210 and from the contextual content dataset 212. If the captured image is not recognized in both the primary content dataset and the contextual content dataset, the device 101 requests the server 110 at operation 408 to retrieve content or an experience associated with the captured image.

At operation 410, the server 110 identifies the captured image and retrieves content associated with the captured image.

At operation 412, the device 101 downloads the content corresponding to the captured image, from the server 110.

At operation 414, the device 101 updates its local storage to include the content. In one embodiment, the device 101 up dates its contextual content dataset 212 with the downloaded content from operation 412.

Input conditions from the device 101 may also be submitted to the server 110 at operation 416. The input conditions may include usage time information, location information, a history of scanned images, and social information. The server 110 may retrieve content associated with the input conditions at operation 418. For example, if the input conditions indicate that the user 102 operates the device 101 mostly from location A, then content relevant to location A (e.g., restaurants nearby) may be retrieved from the server 110.

At operation 420, the device 101 downloads the content retrieved in operation 418 and updates the contextual content dataset based on the retrieved content at 422.

Figure 5:
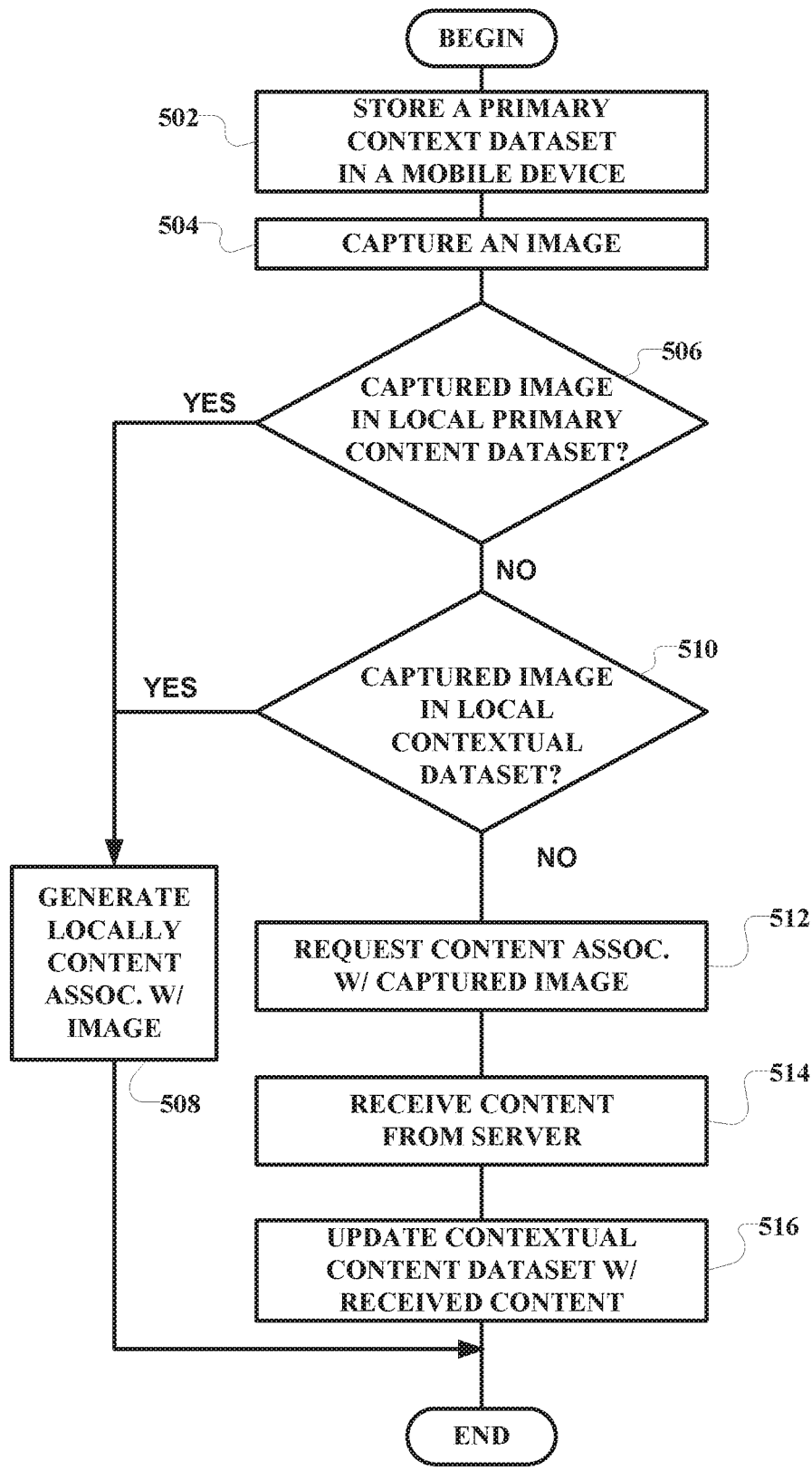
FIG. 5 is a flowchart illustrating an example operation of the contextual local image recognition dataset module of the device, according to some example embodiments.

FIG. 5 is a flowchart illustrating an example operation of the contextual local image recognition dataset module of the device, according to some example embodiments.

At operation 502, the contextual local image recognition dataset module 208 stores the primary content dataset 210 in the device 101.

At operation 504, the augmented reality application 209 determines that an image has been captured with the device 101.

At operation 506, the contextual local image recognition dataset module 208 compares the captured image with a set of images locally stored in the primary content dataset 210 in the device 101. If the captured image corresponds to an image from the set of images locally stored in the primary content dataset 210 in the device 101, the augmented reality application 209 generates an experience based on the recognized image at operation 508.

If the captured image does not correspond to an image from the set of images locally stored in the primary content dataset 210 in the device 101, the contextual local image recognition dataset module 208 compares the captured image with a set of images locally stored in the contextual content dataset 212 in the device 101 at operation 510.

If the captured image corresponds to an image from the set of images locally stored in the contextual content dataset 212 in the device 101, the augmented reality application 209 generates an experience based on the recognized image at operation 508.

If the captured image does not correspond to an image from the set of images locally stored in the contextual content dataset 212 in the device 101, the contextual local image recognition dataset module 208 submits a request including the captured image to the server 110 at operation 512.

At operation 514, the device 101 receives content corresponding to the captured image from the server 110.

At operation 516, the contextual local image recognition dataset module 208 updates the contextual content dataset 212 based on the received content.

Figure 6:
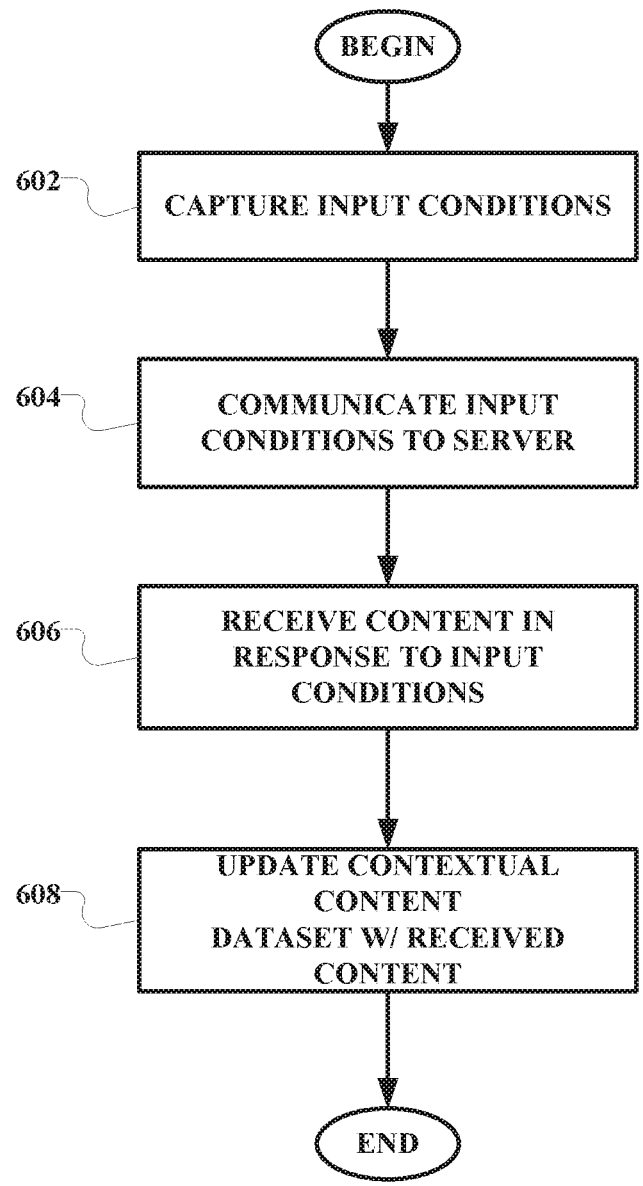
FIG. 6 is a flowchart illustrating another example operation of the contextual local image recognition dataset module of the device, according to some example embodiments.

FIG. 6 is a flowchart illustrating another example operation of the contextual local image recognition dataset module of the device, according to some example embodiments.

At operation 602, the contextual local image recognition dataset module 208 captures input conditions local to the device 101. As previously described, local input conditions may include usage time information, location information, history of scanned images, and social information.

At operation 604, the contextual local image recognition dataset module 208 communicates the input conditions to the server 110. At operation 606, the server 110 retrieves new content related to the input conditions of the device 101.

At operation 608, the contextual local image recognition dataset module 208 up dates the contextual content dataset 212 with the new content.

Figure 7:
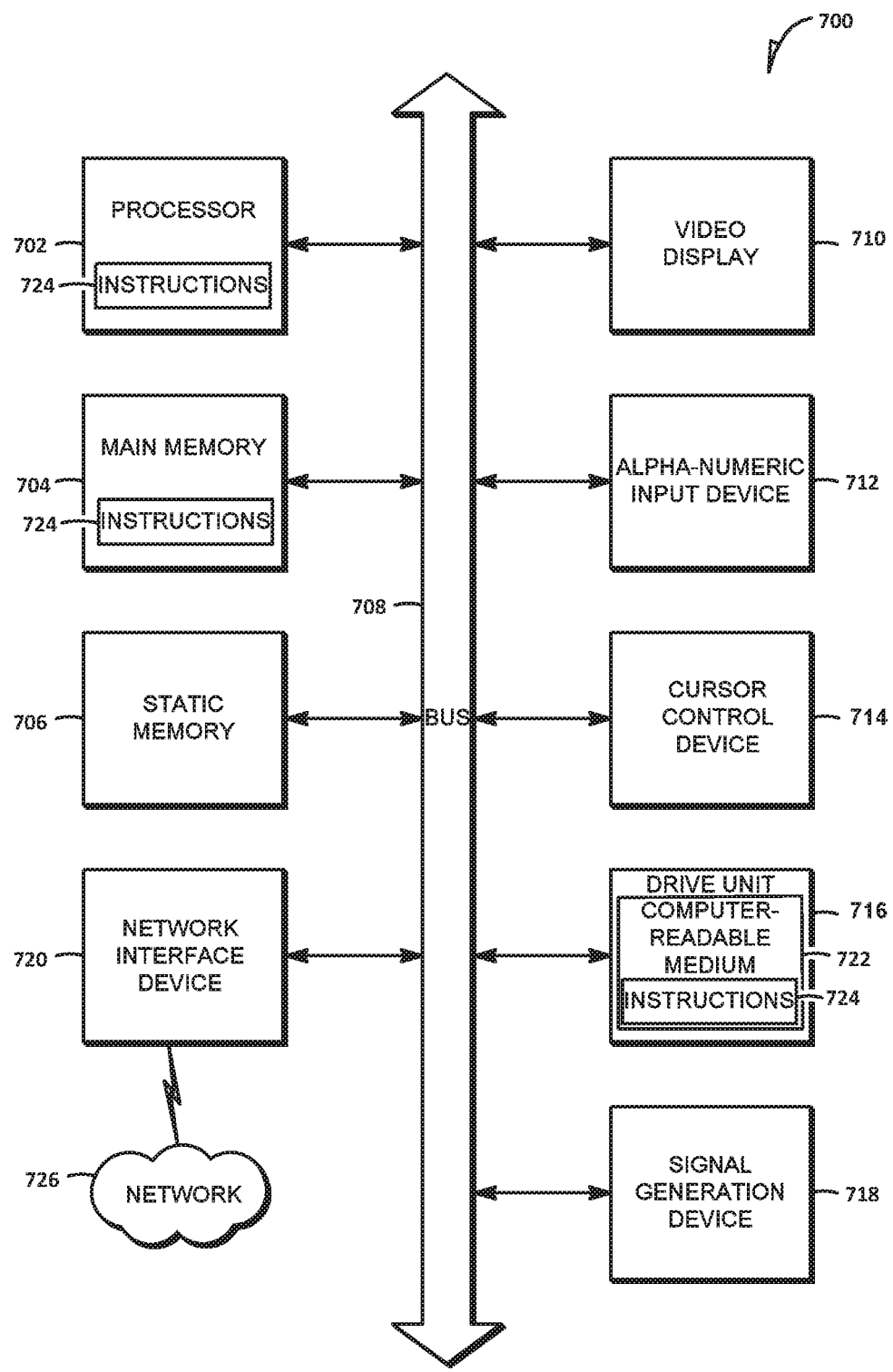
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed, in whole or in part. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a distributed (e.g., peer-to-peer)

network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 (e.g., network 108) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose process or, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating" "determining," "presenting" "displaying" or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   determining, by a computing device, that a first image captured by an optical sensor of the computing device is not included in a primary content dataset stored in a memory of the computing device, the primary content dataset including a subset of images included in a full content dataset stored by a remote server, the primary content dataset having been received by the computing device from the remote server;
   in response to determining that the first image is not included in the primary content dataset stored in the memory of the computing device, transmitting the first image to the remote server, causing the remote server to compare the first image to images included in a full content dataset maintained by the remote server, wherein each image in the full content data set is stored by the remote server along with corresponding virtual content; and
   receiving, from the remote server, virtual content corresponding to a second image from the full content dataset that matches the first image captured by an optical sensor of the computing device.

2. The method of claim 1, further comprising:
   presenting the virtual content on a display of the computing device, the virtual content displayed over a live image of a first physical object that is being concurrently presented on the display of the computing device.

3. The method of claim 1, wherein the computing device is a head-mounted viewing device comprising a transparent display that allows a user wearing the head-mounted viewing device to view content presented on the transparent display while also viewing physical objects visible through the transparent display, the method further comprising:
   presenting the virtual content at a position on the transparent display that overlaps with the user's view of a first physical object captured in the first image.

4. The method of claim 1, further comprising:
   receiving the primary content dataset from the remote server, the primary content dataset including the subset of images from the full content dataset that were most commonly captured by a plurality of computing devices; and
   storing the primary content dataset in a local memory of the computing device.

5. The method of claim 4, further comprising:
receiving, from the remote server, a set of virtual content corresponding to the primary content dataset.

6. The method of claim 1, further comprising:
capturing a second image of a second physical object, the second physical object being different than a first physical object captured in the first image;
comparing the second image of the second physical object to images included in the primary content dataset, yielding a comparison;
determining, based on the comparison, that the second image of the second physical object matches a third image from the primary content dataset; and
presenting, on a display of the computing device, virtual content corresponding to the third image from the primary content dataset.

7. The method of claim 1, wherein determining that the first image is not included in the primary content dataset comprises:
identifying a visual reference captured in the first image; and
comparing the visual reference captured in the first image to visual references captured in the images included in the primary content dataset.

8. A computing device comprising:
one or more computer processors; and
one or more computer-readable mediums storing instructions that, when executed by the one or more computer processors, cause the computing device to perform operations comprising:
determining that a first image captured by an optical sensor of the computing device is not included in a primary content dataset stored in a memory of the computing device, the primary content dataset including a subset of images included in a full content dataset stored by a remote server, the primary content dataset having been received by the computing device from the remote server;
in response to determining that the first image is not included in the primary content dataset stored in the memory of the computing device, transmitting the first image to the remote server, causing the remote server to compare the first image to images included in a full content dataset maintained by the remote server, wherein each image in the full content data set is stored by the remote server along with corresponding virtual content; and
receiving, from the remote server, virtual content corresponding to a second image from the full content dataset that matches the first image captured by an optical sensor of the computing device.

9. The computing device of claim 8, the operations further comprising:
presenting the virtual content on a display of the computing device, the virtual content displayed over a live image of a first physical object that is being concurrently presented on the display of the computing device.

10. The computing device of claim 8, wherein the computing device is a head-mounted viewing device comprising a transparent display that allows a user wearing the head-mounted viewing device to view content presented on the transparent display while also viewing physical objects visible through the transparent display, the method further comprising:
presenting the virtual content at a position on the transparent display that overlaps with the user's view of a first physical object captured in the first image.

11. The computing device of claim 8, the operations further comprising:
receiving the primary content dataset from the remote server, the primary content dataset including the subset of images from the full content dataset that were most commonly captured by a plurality of computing devices; and
storing the primary content dataset in a local memory of the computing device.

12. The computing device of claim 11, the operations further comprising:
receiving, from the remote server, a set of virtual content corresponding to the primary content dataset.

13. The computing device of claim 8, the operations further comprising:
capturing a second image of a second physical object, the second physical object being different than a first physical object captured in the first image;
comparing the second image of the second physical object to images included in the primary content dataset, yielding a comparison;
determining, based on the comparison, that the second image of the second physical object matches a third image from the primary content dataset; and
presenting, on a display of the computing device, virtual content corresponding to the third image from the primary content dataset.

14. The computing device of claim 8, wherein determining that the first image is not included in the primary content dataset comprises:
identifying a visual reference captured in the first image; and
comparing the visual reference captured in the first image to visual references captured in the images included in the primary content dataset.

15. A non-transitory computer-readable medium storing instructions that, when executed by one or more computer processors of a computing device, cause the computing device to perform operations comprising:
determining that a first image captured by an optical sensor of the computing device is not included in a primary content dataset stored in a memory of the computing device, the primary content dataset including a subset of images included in a full content dataset stored by a remote server, the primary content dataset having been received by the computing device from the remote server;
in response to determining that the first image is not included in the primary content dataset stored in the memory of the computing device, transmitting the first image to the remote server, causing the remote server to compare the first image to images included in a full content dataset maintained by the remote server, wherein each image in the full content data set is stored by the remote server along with corresponding virtual content; and
receiving, from the remote server, virtual content corresponding to a second image from the full content dataset that matches the first image captured by an optical sensor of the computing device.

16. The non-transitory computer-readable medium of claim 15, the operations further comprising:
presenting the virtual content on a display of the computing device, the virtual content displayed over a live image of a first physical object that is being concurrently presented on the display of the computing device.

17. The non-transitory computer-readable medium of claim 15, wherein the computing device is a head-mounted viewing device comprising a transparent display that allows a user wearing the head-mounted viewing device to view content presented on the transparent display while also viewing physical objects visible through the transparent display, the method further comprising:
   presenting the virtual content at a position on the transparent display that overlaps with the user's view of a first physical object captured in the first image.

18. The non-transitory computer-readable medium of claim 15, the operations further comprising:
   receiving the primary content dataset from the remote server, the primary content dataset including the subset of images from the full content dataset that were most commonly captured by a plurality of computing devices;
   receiving, from the remote server, a set of virtual content corresponding to the primary content dataset; and
   storing the primary content dataset and the set of virtual content in a local memory of the computing device.

19. The non-transitory computer-readable medium of claim 15, the operations further comprising:
   capturing a second image of a second physical object, the second physical object being different than a first physical object captured in the first image;
   comparing the second image of the second physical object to images included in the primary content dataset, yielding a comparison;
   determining, based on the comparison, that the second image of the second physical object matches a third image from the primary content dataset; and
presenting, on a display of the computing device, virtual content corresponding to the third image from the primary content dataset.

20. The non-transitory computer-readable medium of claim 15, wherein determining that the first image is not included in the primary content dataset comprises:
   identifying a visual reference captured in the first image; and
comparing the visual reference captured in the first image to visual references captured in the images included in the primary content dataset.

\* \* \* \* \*